United States Patent [19]

Velie et al.

[11] 4,244,349
[45] Jan. 13, 1981

[54] PORTABLE FORCED AIR HEATER

[75] Inventors: Wallace W. Velie; Hector Macias, both of Upland, Calif.

[73] Assignee: Scheu Manufacturing Company, Upland, Calif.

[21] Appl. No.: 972,359

[22] Filed: Dec. 22, 1978

[51] Int. Cl.³ .............................................. F24H 3/02
[52] U.S. Cl. ................................. 126/110 C; 432/222
[58] Field of Search ............. 126/110 C, 110 D, 59.5, 126/110 R, 116 R; 432/222, 219; 431/353, 352, 351

[56] References Cited

U.S. PATENT DOCUMENTS

| 2,673,726 | 3/1954 | Oldenkamp | 432/222 |
| 2,853,284 | 9/1958 | Freeman | 432/222 |
| 2,879,837 | 3/1959 | Downs | 432/222 X |
| 3,064,720 | 10/1960 | Keating et al. | 432/222 X |
| 3,494,599 | 2/1970 | Stupak, Jr. et al. | 126/110 C X |
| 3,645,512 | 2/1972 | Dent et al. | 126/110 C X |
| 3,689,040 | 9/1972 | Reich | 432/222 |
| 3,706,446 | 12/1972 | Briggs | 432/222 |
| 4,081,238 | 3/1978 | Briggs et al. | 432/222 |

Primary Examiner—Samuel Scott
Assistant Examiner—Randall L. Green
Attorney, Agent, or Firm—Fleit & Jacobson

[57] ABSTRACT

A portable forced air heater having a flame holder positioned between a blower and a combustion chamber. The flame holder has a plurality of holes or openings formed therein to stabilize and control the combustion process within the combustion chamber. The holes or openings are arranged in such manner that the percentage of total flame holder area devoted to holes or openings increases at a general uniform rate as the distance from the center of the flame holder increases. The flame holder also has openings formed therein to support various components of the heater in order to provide a relatively small compact forced air heater.

9 Claims, 15 Drawing Figures

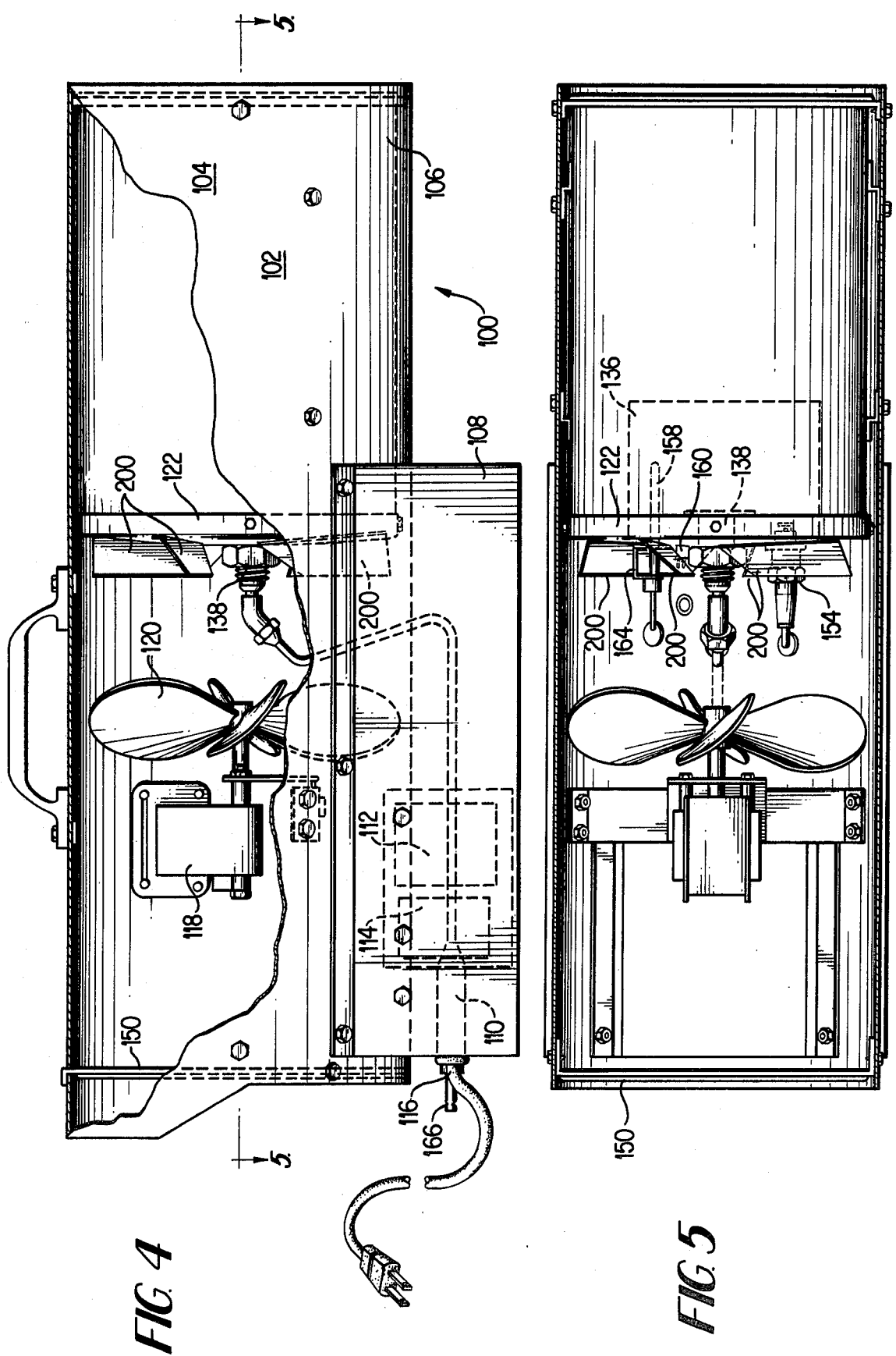

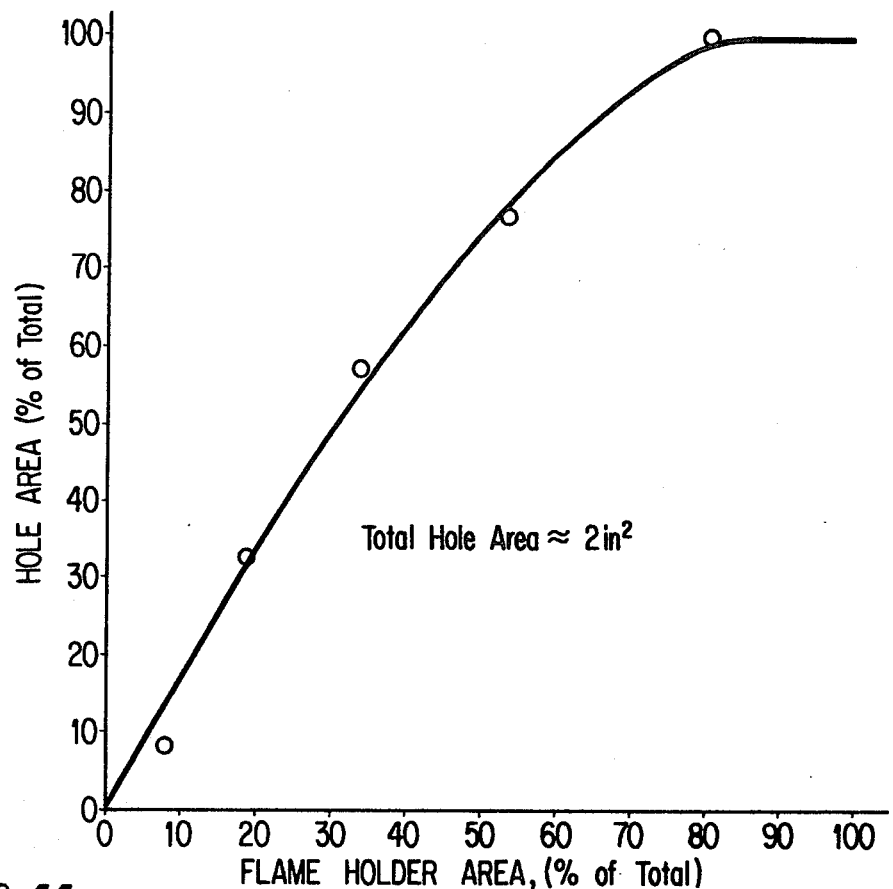
FIG. 11 OPTIMUM HOLE SIZE AND DISTRIBUTION IN THE FLAME HOLDER
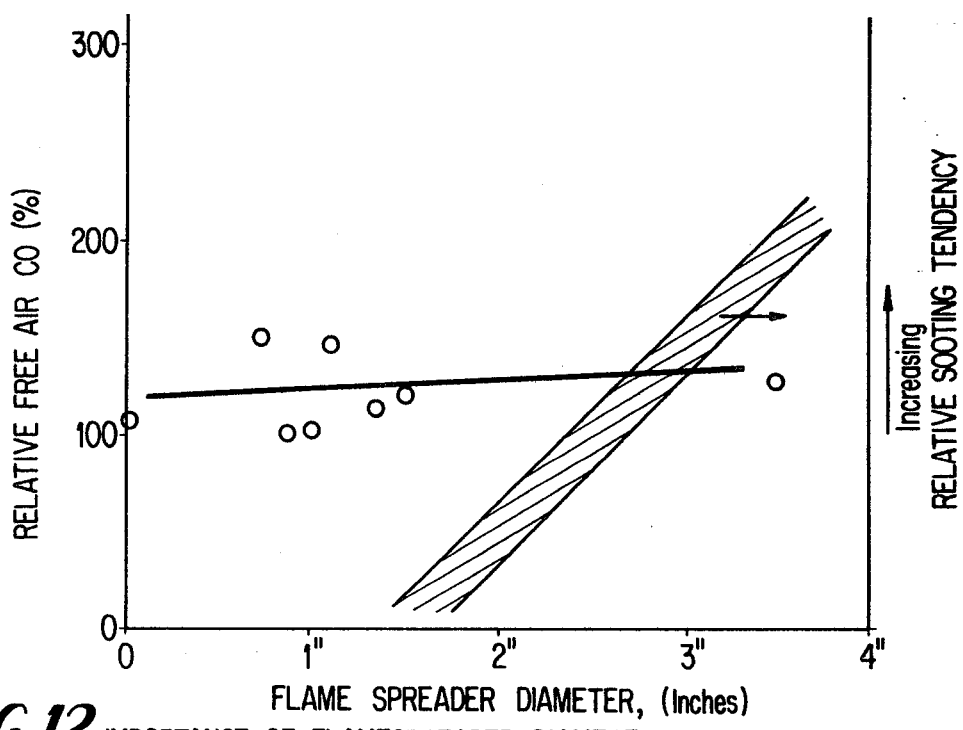
FIG. 12 IMPORTANCE OF FLAMESPREADER DIAMETER

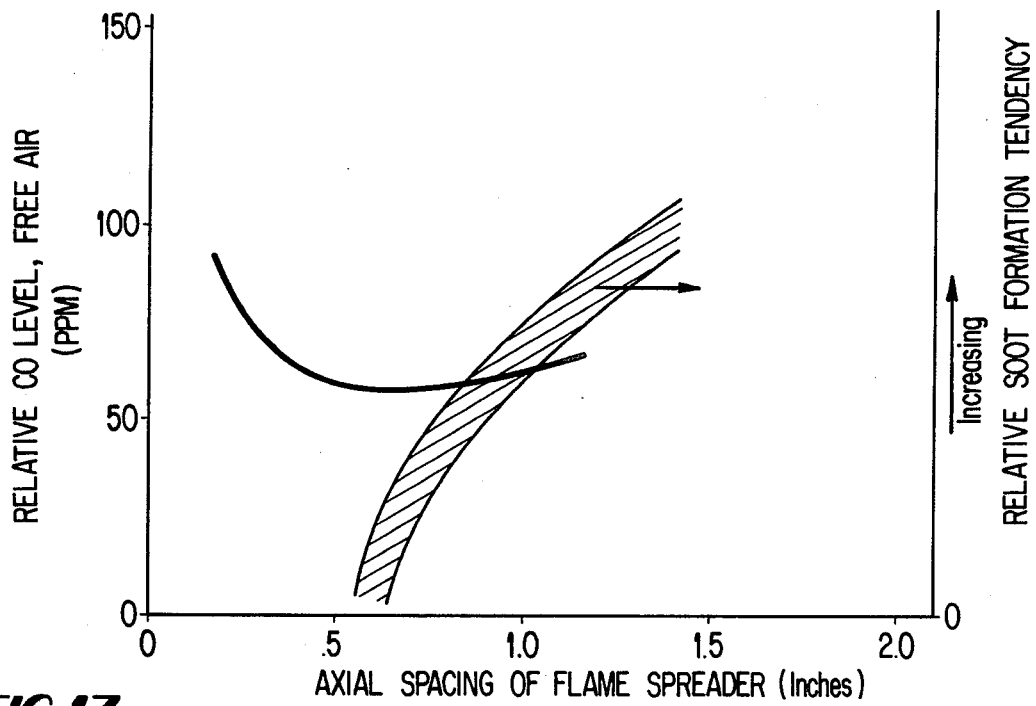
FIG. 13 IMPORTANCE OF AXIAL POSITION OF FLAME SPREADER
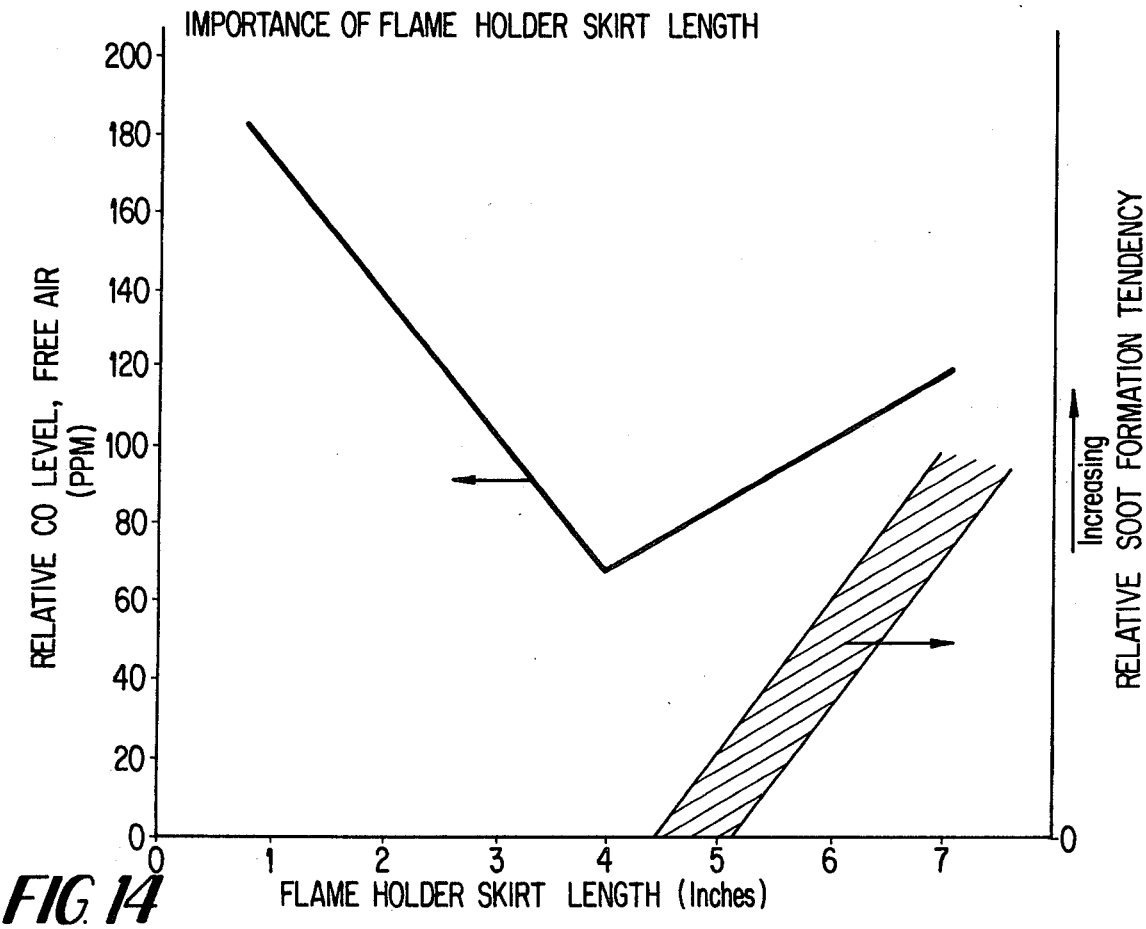
FIG. 14

PORTABLE FORCED AIR HEATER

BACKGROUND OF THE INVENTION

1. Field of the Invention

This invention relates to forced air heaters of the type disclosed in U.S. Pat. No. 3,494,599 and U.S. Pat. No. 3,645,512, the disclosures of which are incorporated herein by reference, and which are assigned to the assignee of the present application.

The present invention relates particularly to a relatively small and compact portable forced air heater for providing a high heat output.

2. Description of the Prior Art

Various types of heaters and forced air heaters have been devised in the past. Typical heaters having a high heat output have been relatively large and bulky and sometimes have lacked suitable safety features. The heaters disclosed in the referenced patents represent a substantial improvement over such prior heaters. The present heater involves further improvements in the provision of a smaller and more compact heater which is of modular construction and relatively easy to service, and which also incorporates several novel structural features.

The increasing cost of energy provides incentive to reduce heating load by heating only specific areas in use. Local heating rather than total heating requires very small temporary heaters which can be distributed as required to provide the most efficient heat utilization. Such heaters require revolutionary design in order to concurrently provide the required temperature distribution, combustion cleanliness and safe operation.

SUMMARY OF THE INVENTION

Accordingly, it is a principal objective of the invention to provide an improved, small, forced air, gas heater.

Also, the present invention provides a heater having a compact configuration which delivers uniform heat output and operates for approximately 8 hours on a standard 5-gallon propane gas bottle (i.e. 40,000 BTU/hr).

Another objective of this invention is to achieve combustion cleanliness of less than 50 ppm carbon monoxide, with correspondingly low rates of accumulation of soot and carbon.

Still another objective is to provide safe operation in the event of malfunction or misuse.

Accordingly, the heater of the present invention is an improved version of forced air heaters of the type described in the aforementioned U.S. Pat. Nos. 3,494,599 and 3,645,512. The heater has a combustion chamber positioned downstream of a blower. The upstream end of the combustion chamber is formed by a flame holder having a plurality of openings formed therein to provide communication between the blower and the combustion chamber. The openings are arranged in such manner that they stablize and control combustion within the combustion chamber. The size and placement of holes is selected so that the percentage of total flame holder area devoted to holes or openings increases at a generally uniform rate, as the distance from the center of the flame holder increases. Preferably, the openings closest to the center are circular-shaped with uniform diameters and are arranged in a plurality of concentric rings. As the diameter of the rings increases, the number of openings in the rings correspondingly increases. Since the distribution of holes or openings becomes less critical as the distance from the center of the flame holder increases, holes or openings spaced at greater distances from the center can have a larger diameter than those closer to the center.

In order to provide a compact heater, the flame holder includes openings or holes for supporting a fuel nozzle, a spark plug, a flame sensor, a housing defining a combustion chamber surrounding the fuel nozzle, and a sensor for sensing the buildup of heat in a larger combustion chamber coaxial with and surrounding the aforementioned combustion chamber. The heater also includes a control system for terminating fuel flow to the heater in case of loss or interruption of electrical power, malfunction of heater components, blockage of the heater, or other factors resulting in excessive buildup of heat.

The combustion system used in the heater of the present invention provides excellent ignition characteristics over a 2 to 1 range, excellent flame containment, uniform flame distribution, and results in little or no undesirable variations in heater operational performance. For example, the surface temperature of the heater has not been affected nor have floor temperature or average exhaust gas temperature been unduly changed.

These and other objects and features of the present invention will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 4 is a side elevation, partially in section, of the heater according to the present invention;

FIG. 5 is a view along line 5—5 of FIG. 4;

FIG. 11 is a chart illustrating hole size and distribution in the flame holder of FIG. 7;

FIG. 12 is a chart illustrating the effects of variations in size of one component of the heater of FIG. 4 on carbon monoxide and soot accumulation;

FIG. 13 is a chart illustrating the effects of variations in position of one component of the heater of FIG. 4 on carbon monoxide emissions and soot accumulation; and FIG. 14 is a chart illustrating the effects of variations in size of another component of the heater of FIG. 4 on carbon monoxide emissions and soot accumulation.

DESCRIPTION OF THE PREFERRED EMBODIMENTS

Because forced-air heaters are well known, the present description will be directed in particular to elements forming part of, or cooperating more directly with, the present invention. Elements not specifically shown or described herein are understood to be selectable from those known in the art.

Figure 1:
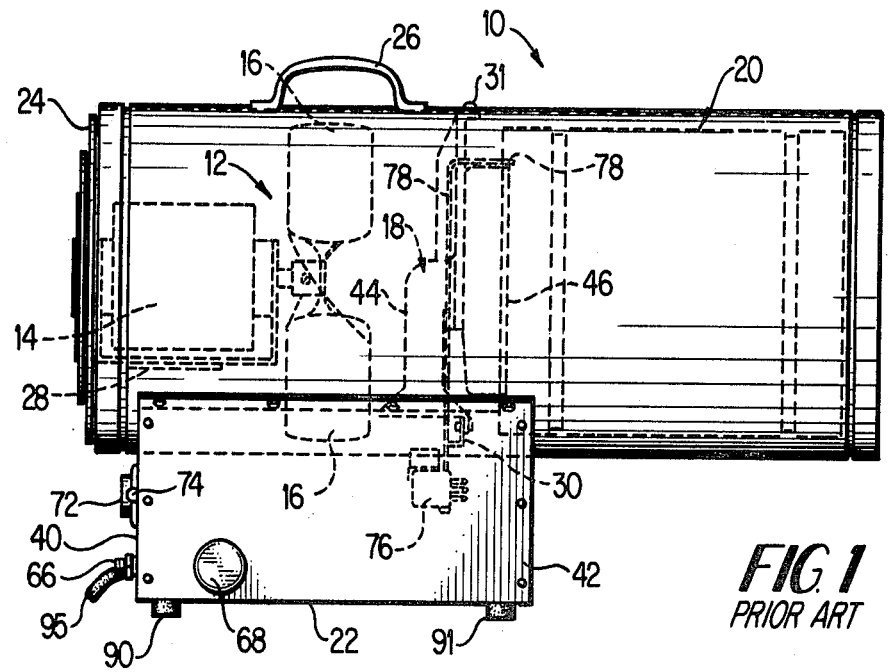
FIG. 1 is a side view of a portable heater known to the prior art.
Figure 2:
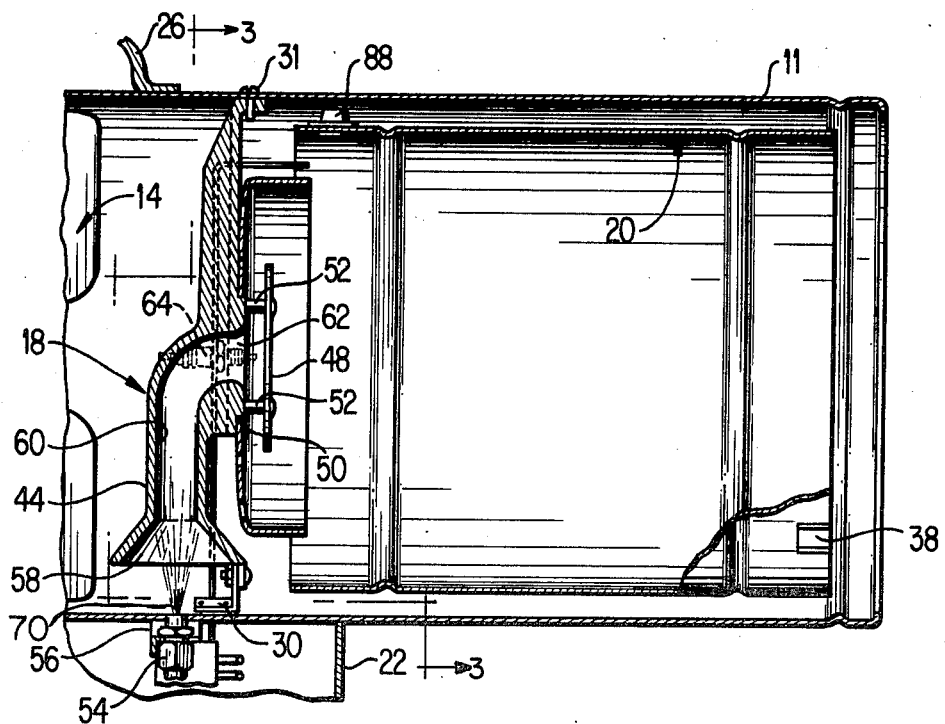
FIG. 2 is a cross-sectional view of a portion of the heater of FIG. 1 illustrating the placement of the burner assembly and tube liner thereof.
Figure 3:
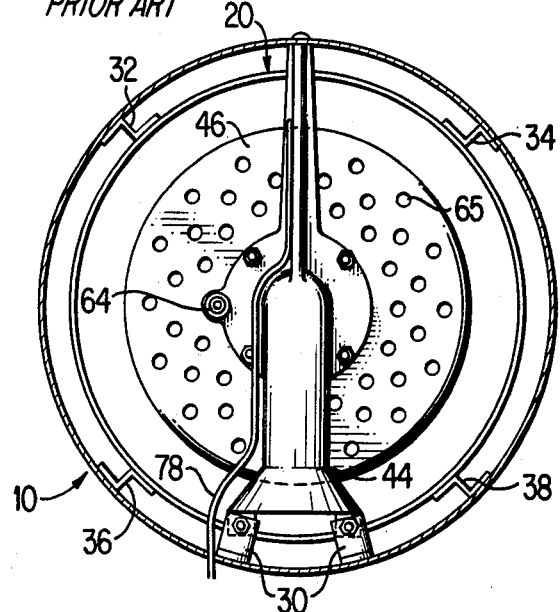
FIG. 3 is a view of the burner assembly taken along line 3—3 of FIG. 2.

Turning now to the drawings, and to FIGS. 1 to 3 in particular, a forced-air heater of the type described in U.S. Pat. Nos. 3,494,599 and 3,645,512 is illustrated. The heater, which is generally designated 10, has an outer metal tubular shell 11 within which is mounted a blower 12 having a fan motor 14 and blade 16. Also, a burner assembly 18 and a liner 20 are mounted within the shell 11 coaxially with respect to a combustion chamber 20 positioned within the shell 11. The shell 11 is mounted on a control assembly or box 22 which houses the control components for the motor and burner. An inlet grill 24 and carrying handle 26 are provided. A typical heater may be approximately 20 inches tall and 30 inches long, with the diameter of the shell 11 being approximately 13 inches.

The motor 14 is mounted within the shell 11 on a motor mounting plate 28, and the burner assembly 18 is mounted within the shell 11 on brackets 30 and secured to the top of the shell by a bolt 31. The liner 20 is mounted within the downstream end of the shell 11 by means of spacers 32, 34, 36, 38, as best seen in FIG. 3, in such manner that a first annular air space is formed between the liner or heat shield 20 and the shell 11, and a second annular air space is formed between the liner 20 and combustion chamber 21. The first annular air space aids in keeping the exterior of the heater cool, while the second annular air space both aids in keeping the exterior cool and provides secondary combustion air.

The spacers used to mount the liner 20 may be spot welded or bolted between the shell and liner. The shell 11 is bolted to the top of the control box assembly 22. A control panel 40 and an access panel 42 are provided as covers for the control box assembly 22.

The burner assembly 18 includes a burner venturi mixer and burner 44, as best seen in FIGS. 2 and 3, and the same may be constructed of cast aluminum. The burner assembly also includes a flame spreader backplate 46 which may be formed of stainless steel, and a front plate 48. The backplate 46 is mounted on a step 50 of the burner venturi 44 and the front plate 48 is spaced from the venturi by means of a plurality of spacers 52. The plates 46 and 48 and spacers 52 are secured to the burner venturi 44 by means of a plurality of bolts and nuts. A gas nozzle assembly 54 is secured to the bottom of the shell 11, as best seen in FIG. 2, by means of a support bracket 56 and supplies gas to the throat 58 of the burner venturi 44. The throat 58 is restricted at 60, and a typical diameter at the restriction is one inch. The venturi includes a chamber in the form of an elbow which flares slightly upstream of the throat such that the outlet 62 thereof has a slightly greater diameter, such as one and one-eighth inch. An igniter, such as a spark plug 64, is provided to ignite the gas and air mixture emanating from the outlet of the burner venturi. The primary air for combustion is derived from air blown by the blower which enters the throat 58 along with gas from the nozzle assembly 54.

The flame spreader backplate 46 is cup-shaped and has a plurality of holes 65 formed therein through which air from the blower passes and mixes with the air/gas mixture from the burner venturi. This is secondary air used to complete combustion. The flame normally commences between the plates 46 and 48 a fraction of an inch from the periphery of the front plate, and this is a function of gas pressure and velocity. The backplate 46 has, for example, three rows of sixteen holes each, as shown in FIG. 3. The inner row of holes may be on a radius of 2½ inches, the next row of holes on a radius of 3-3/32 inches, and the outer row of holes on a radius of 3-11/16 inches. Each of the holes typically may be 11/32 inch in diameter, and adjacent holes are spaced apart approximately 11¼ degrees. It will be apparent that the air supply for combustion is forced, with the principal mixing occurring in the burner venturi chamber. The burner arrangement illustrated enables the shell 11 to be shorter than usual while still providing a high B.t.u. output and good combustion. The liner 20 acts as a reflector to maintain the shell 11 cool. Inasmuch as there is an annular forced air space about the liner 20, heat absorbed by the liner is removed by the flowing air stream.

The operation of the device illustrated in FIGS. 1 to 3 is described in the aforementioned U.S. Pat. No. 3,494,599.

Referring again to the figures, and in particular to FIGS. 4 to 10, embodiments of the present invention will be described.

As illustrated in FIGS. 4 and 5, one embodiment of a forced-air heater according to the present invention, which is generally designated 100, has a housing 102 formed of cylindrical half shells 104 and 106 attached to a base section 108. The base section 108 houses heater control components, such as a gas valve 110, an igniter 112, a valve control relay 114, and an igniter push button 116. A fan motor 118 is mounted within half shell 106, and a suitable fan 120 is attached to the shaft of the motor. The motor 118 and fan 120 provide combustion air.

In order to concurrently provide heater compactness, sufficient air flow for low temperature rise, and clean combustion, one embodiment of the present invention utilizes a motor that rotates a seven inch diameter fan at approximately 3000 RPM.

Figure 6:
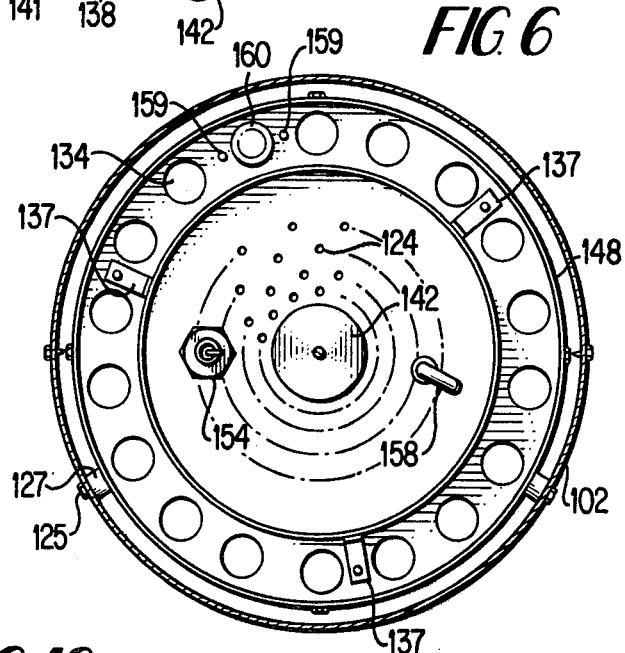
FIG. 6 is an exhaust end view showing relative position of major components.
Figure 8:
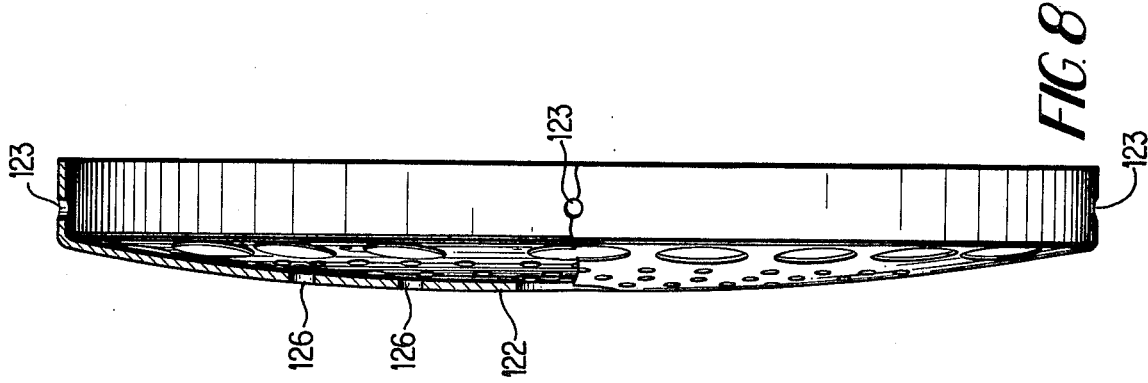
FIG. 8 is a side view of the flame holder of FIG. 7.

A flame holder 122 is positioned within the housing 102 downstream of the fan 120. As illustrated in FIG. 8, the flame holder 122 is generally cup or dish-shaped and has side walls with a plurality of openings 123 formed therein for receiving screws 125 or other suitable members for connecting the flame holder to a cylindrical liner 148. Also, as illustrated in FIG. 6, spacers 127 provide proper alignment.

Figure 7:
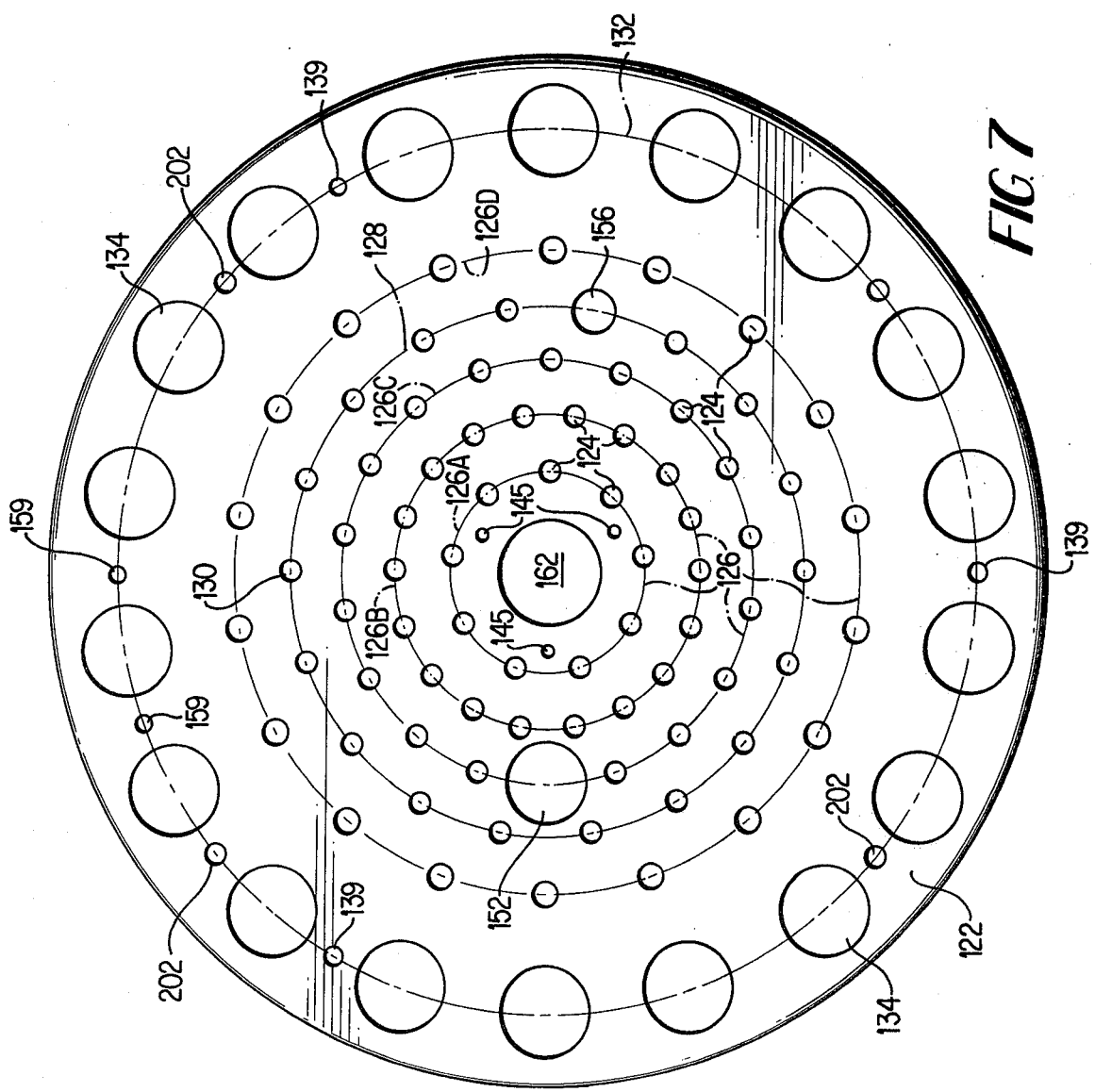
FIG. 7 is an end view of a flame holder used in the heater of FIG. 4, showing relative hole spacing and location.

The flame holder 122 includes a plate member or bottom having a plurality of openings provided therein to stabilize and control the combustion process. As illustrated in FIG. 7, one embodiment of the flame holder 122 has more than sixty, for instance sixty-two, small holes 124 spaced circumferentially in four concentric rings 126. The size and spacing of the holes 124 is critical to the combustion process and must be specifically matched to fan performance. In the illustrated embodiment, the holes or openings 124 have a diameter of approximately 3/16 inches, with ring 126A having a diameter of approximately 1⅜ inches, ring 126B having a diameter of approximately 2-5/32 inches, ring 126C having a diameter of approximately 2-29/32 inches, and ring 126D having a diameter of approximately 4⅛ inches. A ring 128, having holes or openings 130, with diameters of approximately 5/32 inches, is positioned concentric with and intermediate rings 126C and 126D. The diameter of ring 128 is approximately 3⅜ inches. A sixth concentric ring surrounds the rings 126 and 128 and has eighteen holes or openings 134. Preferably, the holes 134 have diameters of ⅜ inches, with the ring 132 having a diameter of approximately 6⅛ inches.

Referring now to FIG. 11, it can be seen that the size and placement of holes has been selected in such manner that the percentage of total flame holder area devoted to holes or openings increases at a generally uniform rate, as the distance from the center of the flame holder increases, with no holes or openings positioned in outermost regions of the flameholder. The rate is maintained uniform by increasing the number and/or size of openings formed in the flameholder as the distance from the center of the flameholder increases.

Both the hole size and spacing are important. Excessive hole area produces a high CO reading, while inadequate hole area causes excessive soot accumulation on the face of the flame holder. Likewise, excessive hole spacing toward the outer periphery of the flame holder causes excessive localized soot accumulation. Hole distribution toward the center of the flame holder is most critical since it influences both high and low burn rates. Thus, numerous small holes are required near the center, while either few large or many small holes can be used near the outer periphery where spacing is less critical.

Generally, it has been found that hole distribution should be homogeneous and that an increase in hole area and spacing with flame holder area, as shown by FIG. 11, is optimum. The optimized flame holder, as previously discussed, has rows of holes distributed on an area basis as shown by FIG. 7. The optimum total hole area for minimum CO production has also been found to be slightly above that calculated to be required for stoichiometric air entry into the flame holder. These appear to be important criteria for general use in flame holder design.

Referring now to FIG. 5, it will be noted that a combustion chamber 136 is attached to the flame holder 122. Preferably, the chamber is connected to the flame holder by brackets 137, as illustrated in FIG. 6, riveted to openings 139 in the flame holder. In one embodiment of the present invention, the combustion chamber 136 has a diameter of approximately 5 inches and a length of approximately 4 inches. Thus, the end of the combustion chamber 136 connected to the flame holder 122 separates the rings 126D and 132 from each other. The holes 134 provide for a secondary air flow which is mixed with the combustion gases in another combustion chamber positioned just downstream of and surrounding the combustion chamber 136.

The combustion chamber 136 limits excessive dilution of the combustion zone with air. As illustrated in FIG. 14, a flameholder skirt length of approximately four inches provides good results. Longer lengths result in soot accumulation, while shorter lengths result in excessive carbon monoxide emissions.

Figure 9:
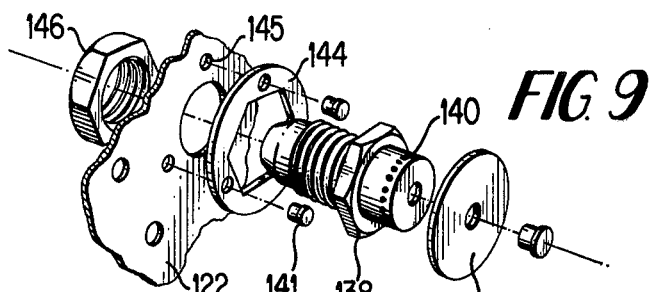
FIG. 9 is an exploded view of a fuel nozzle assembly used with the heater of FIG. 4.

Referring now to FIGS. 5 and 9, the heater 100 includes a fuel nozzle assembly 138 connected to flame holder 122 by rivets 141 which pass through a holding plate 144 into openings 145 in holder 122. The nozzle 138 has a plurality of small radial openings or holes 140, for instance eighteen holes, preferably equally spaced about its periphery. Propane gas or other suitable fuel is injected through the holes or openings 140 into the combustion chamber 136 just downstream of the flame holder 122. A flame spreader 142 is attached to the downstream end of the fuel nozzle 138 to enhance radial spreading and mixing of propane or other suitable fuel with air passing through the flame holder 122. As illustrated in FIG. 12, the diameter of the flame spreader has little effect on the rate of carbon monoxide emission; however, soot tends to accumulate when the diameter exceeds approximately 1.5 inches. Also, as illustrated in FIG. 13, an axial spacing of the flame spreader 142 from the flame holder 122 of approximately 0.5 inches provides optimum results. If the distance is too small, carbon monoxide emissions are too high. If the distance is too large, soot tends to accumulate. An axial movement of ⅛ inch can be the difference between considerable soot formation and no soot formation at all. The fuel nozzle is centered and retained on the flame holder 122 by engagement between a hexagonally-shaped collar of the nozzle and the sides of indexing ring 144. A nut 146 provides the required axial adjustment. The axial position of the fuel orifices 140 with respect to the flame holder 122 is another dimension of considerable importance to performance.

Additional components of the heater of the present invention include a cylindrical liner 148 mounted coaxially with respect to the heater housing 102 and combustion chamber 136 to aid in keeping the exterior of the heater 100 cool. Also, a grill or screen 150 is mounted at the heater inlet to prevent large objects from entering the heater. Preferably, a similar grill is mounted at the outlet to keep objects out of the combustion chamber.

Figure 7A:
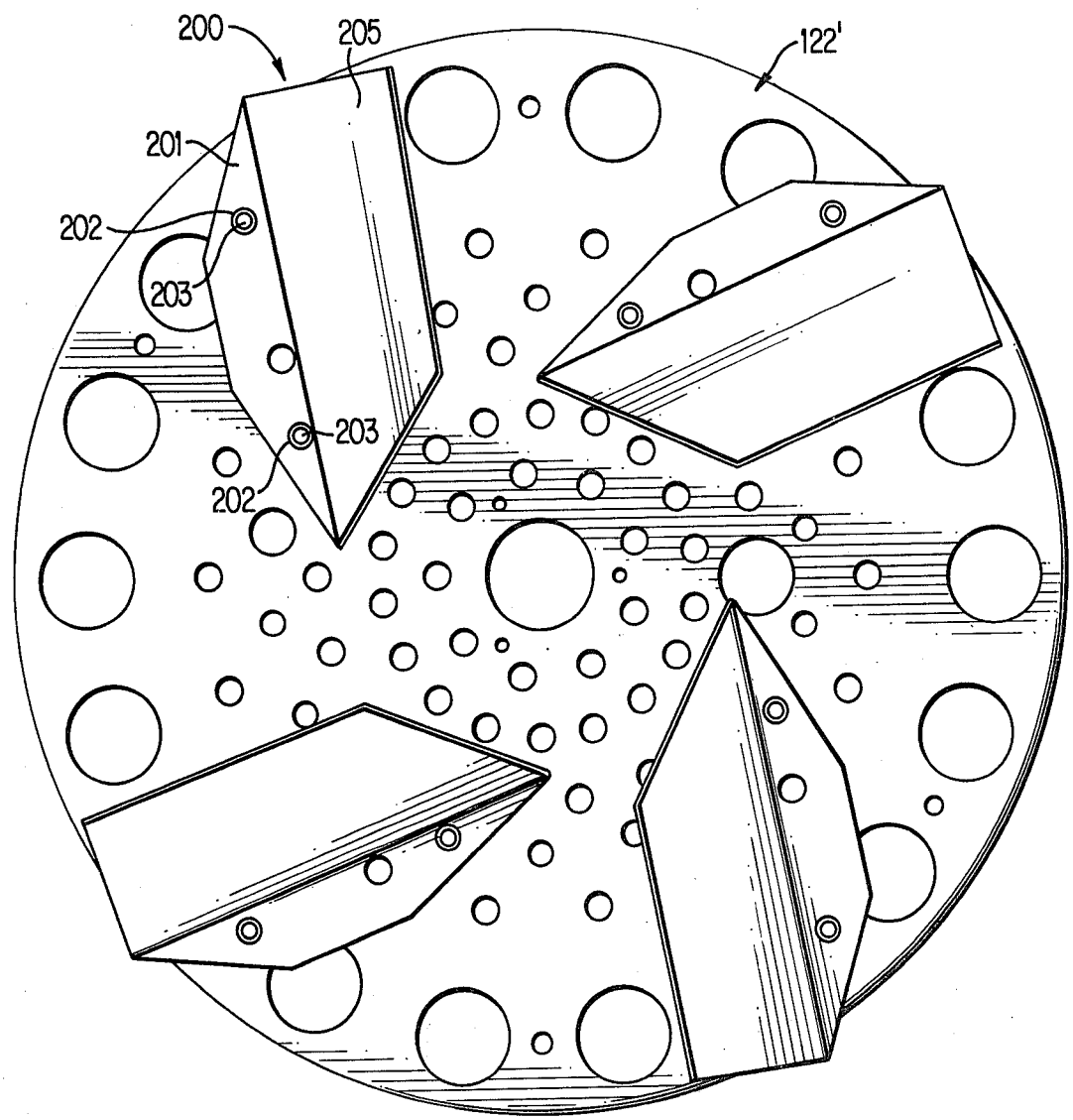
FIG. 7a is a view similar to FIG. 7 illustrating a modified embodiment of the present invention.

One embodiment of the present invention utilizes a flame holder 122 of the type illustrated in FIG. 7. Another embodiment utilizes a flame holder of the type illustrated in FIGS. 4, 5, and 7a. This flame holder, which is generally designated 122', is the flame holder 122 modified to include a plurality of air straightening fins 200. As illustrated in FIG. 7a, each of four air straightening fins 200 has a base or side wall 201 with a plurality of openings 202 formed therein. The openings 202 receive rivets 203 or other suitable connectors for connecting the fins 200 to the flame holder 122. Each of the side walls 201 are approximately ½ inch wide and 3 inches long. Each side wall 201 is connected to a second or upstanding side wall 205 at an angle of approximately 125°. The side walls 205 are approximately 1⅝ inches wide by 3 inches long. The angle between the walls 205 and 201 is very important for directing the air. The four air straightening fins 200 reduce the swirl created by the fan and, therefore, improve the uniformity of the velocity profile across the flame holder 122. Thus, air flow is increased through the inner openings 124 and 130 of the flame holder and, at the same time, the air distribution mixing with the fuel in the combustion chamber 136 is improved.

Considering again the flame holder 122, it includes an opening 152 for mounting or receiving a spark plug 154, an opening or hole 156 for receiving a flame sensor 158, and openings 159 for receiving a mounting bracket supporting a high temperature sensor 160. The spark plug 154 provides automatic ignition of the fuel. Its predetermined and positive alignment with the fuel nozzle 138 is obtained by the spacing between opening 152 and a fuel nozzle opening 162. The flame sensor 158 is a thermocouple which extends through aperture or opening 156 and is held in position by a bracket 164, so that flame impinges on its tip. The heat of the flame results in a small voltage being generated by the thermocouple 158 that is used to hold open the thermoelectric gas valve 110. The high temperature sensor 160 is mounted with respect to flame holder 122 in such manner that any interruption in air flow, such as that caused by fan failure or duct blockage, causes the high temperature sensor 160 to interrupt the current furnished valve 110 by high temperature couple 158. Restarting of the heater 100, after such automatic interruption, requires manual operation of the valve 110 by manipulation of a control knob or button 166.

Figure 10:
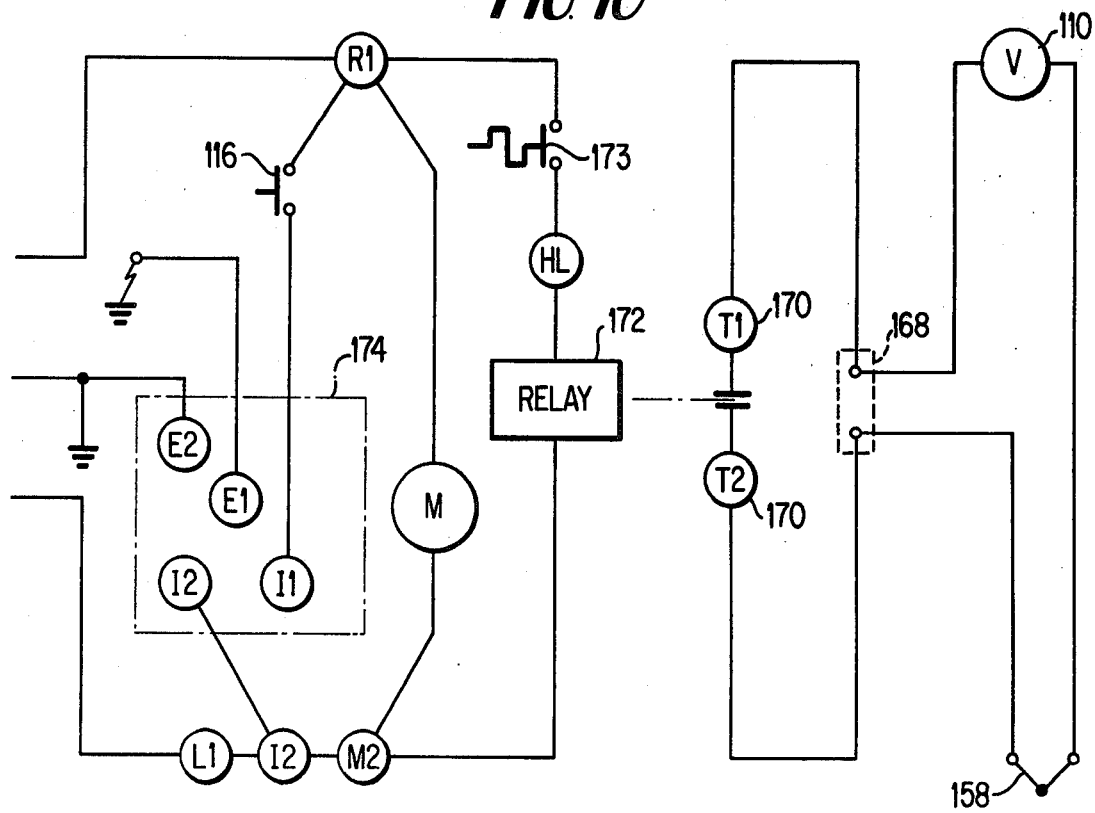
FIG. 10 is an electrical schematic of a control scheme used with the heater of FIG. 4.

Details of the electrical components of the control system used in the present invention are illustrated in FIG. 10. The main flame safety control is via a thermoelectric solenoid-actuated valve 110 which is controlled by thermocouple 158. Both of these elements are commonly used in gas appliances. Gas is initially admitted to the heater by depressing button 166 (illustrated in FIG. 4) to open thermoelectric valve 110. The heater is then started and flames are generated. When the thermocouple 158 senses flame, it generates enough current to hold the valve 110 open and the button 166 can be released. If the flame becomes extinguished while the heater is operating, the thermocouple 158 cools, ceases to generate electrical current, and the valve 110 automatically closes. In order to prevent continuation of gas flow if electrical power is disconnected (i.e., fan-motor stops), a junction block 168 is placed in the thermocouple circuit. The junction block 168 is connected to relay contacts 170 which are closed by relay coil 172 when electrical power is provided to the heater. Disconnection or interruption of electrical power causes the relay coil 172 to open contacts 170 thereby automatically closing the thermoelectric valve 110. The high temperature sensor 160 controls a high limit switch 173 connected to the relay coil 172 so that any overtemperature will automatically close the gas valve 110. In combination with the control system just described is a manual spark ignition system consisting of a solid state capacitive discharge ignition source 174 and push button ignitor activation switch 116. The ignitor input is connected electrically to a 115-volt source of power via the push button switch 116. When the push button switch 116 is closed, high voltage electrical impulses are generated by the ignitor 174 which, being connected to the spark plug 154, causes a spark to jump at the spark plug 154 igniting the fuel-air mixture. As previously mentioned, this specific method of control, its safety features, and ignition are unique.

Since the heater of the present invention is intended to be portable, control members such as ignitor push button 116 and button 166 are illustrated as being manually operated. It will be appreciated that these members could be automatically operated if the heater of the present invention was installed in a permanent or semi-permanent manner. Thus, the embodiment of the invention described herein is to be considered in all respects as illustrative and not restrictive. The scope of the present invention is set forth in the appended claims, rather than in the foregoing description. All changes which come within the meaning and range of equivalence of the appended claims are intended to be embraced therein.

We claim:

1. In a forced air heater having means for defining a shell, means positioned within the shell for defining a combustion chamber, means positioned upstream of the combustion chamber for blowing air through the combustion chamber, nozzle means for injecting a fuel to be burned into the combustion chamber, and means for igniting the injected fuel, the improvement comprising means positioned between the combustion chamber and the means for blowing air for defining a flame holder, said means for defining a flame holder forming an upstream end wall of the combustion chamber and comprising a plate member having a plurality of openings defined therein, a first group of said openings providing communication between the means for blowing and the combustion chamber and being arranged to stabilize and control combustion within the combustion chamber, the first group of said openings including a first plurality of openings having a relatively small size and positioned close to the center of said plate member and a second plurality of openings spaced at a greater distance from the center of said plate member, said first and said second plurality of openings being positioned in such manner that the percentage of total plate member area devoted to openings increases at a generally uniform rate as the distance from the center of the plate member increases, said means for defining a flame holder including a side wall having openings formed therein for attaching said means for defining a flame holder to the means for defining a shell, and the means for defining a combustion chamber including first means connected to said shell for defining a first combustion chamber and second means connected to a portion of said plate member spaced from the outer periphery thereof for defining a second combustion chamber positioned within and surrounded by said first combustion chamber, the downstream end of said second combustion chamber opening into said first combustion chamber, said first plurality of openings providing communication between said means for blowing and said second combustion chamber and said second plurality of openings providing direct communication between said means for blowing and said first combustion chamber.

2. The improvement of claim 1 wherein said first plurality of openings are arranged in a plurality of concentric rings around the center of the plate member, with the number of openings in each ring increasing as the distance from the center of the plate member increases.

3. The improvement of claim 1 wherein said first plurality of openings have the same size and are arranged in a plurality of concentric rings around the center of the plate member, with the number of openings in each ring increasing as the distance from the center of the plate member increases.

4. The improvement of claim 3 wherein said second plurality of openings have a larger size than said first plurality of openings and are arranged in a ring concentric with the center of the plate member.

5. The improvement of claim 4 wherein the plate member includes a plurality of additional openings positioned between outer rings of said first plurality of openings, said additional openings providing communication between said means for blowing and said second combustion chamber and having a size smaller than said first plurality of openings.

6. The improvement of claim 1 wherein a second group of said openings defined in said means for defining a plate member includes an opening for receiving the nozzle means, an opening for receiving the means for igniting, an opening for receiving fastening means connected to means for defining a second combustion chamber within the combustion chamber defined by the means positioned within the shell, an opening for receiving means for sensing a flame within the second combustion chamber, and an opening for receiving means for sensing the temperature within the combustion chamber.

7. The improvement of claim 1 wherein said means for defining a plate member includes a plurality of air straightening fins positioned on said plate member and extending towards said means for blowing air, said fins reducing air turbulence and increasing air flow through said first plurality of openings.

8. The improvement of claim 7 wherein each of said fins has a base portion attached to said plate member and an upstanding portion forming an angle greater than 90° with said base portion.

9. A forced air heater comprising:
means for defining a shell;
means connected to said shell for defining a first combustion chamber within said shell, said means including a plate member defining a flame holder;
means connected to said flame holder for defining a second smaller combustion chamber concentric with and having an open end communicating with said first combustion chamber;
blowing means positioned upstream of the combustion chambers for blowing air through the flame holder into the combustion chambers;
nozzle means for injecting a fuel to be burned into the second combustion chamber;
igniting means for igniting fuel injected into the second combustion chamber;
sensing means for sensing the flame within one of said combustion chambers; and
means responsive to said sensing means for controlling said nozzle means;
said flame holder including:
aperture means spaced from the periphery of said plate member for attaching the means defining said second combustion chamber to said plate member;
a plurality of first openings having a uniform relatively small size arranged in concentric rings around the center of said plate member, the number of openings in the rings increasing with increasing ring diameter;
a plurality of second openings concentric with and intermediate outer rings of said first openings, said first and said second openings providing communication between said blowing means and said second combustion chamber;
a plurality of third openings concentric with and surrounding said first and second openings, said third openings being larger than said first openings and providing direct communication between said blowing means and said first combustion chamber;
an opening extending through said flame holder for receiving said nozzle means so that said nozzle means is in fluid communication with said second combustion chamber;
an opening extending through said flame holder for receiving said igniting means so that a portion of said igniting means extends into said second combustion chamber; and
an opening extending through said flame holder for receiving said sensing means so that a portion of said sensing means is positioned to sense flame within said one of said combustion chambers.

* * * * *